No. 756,231.

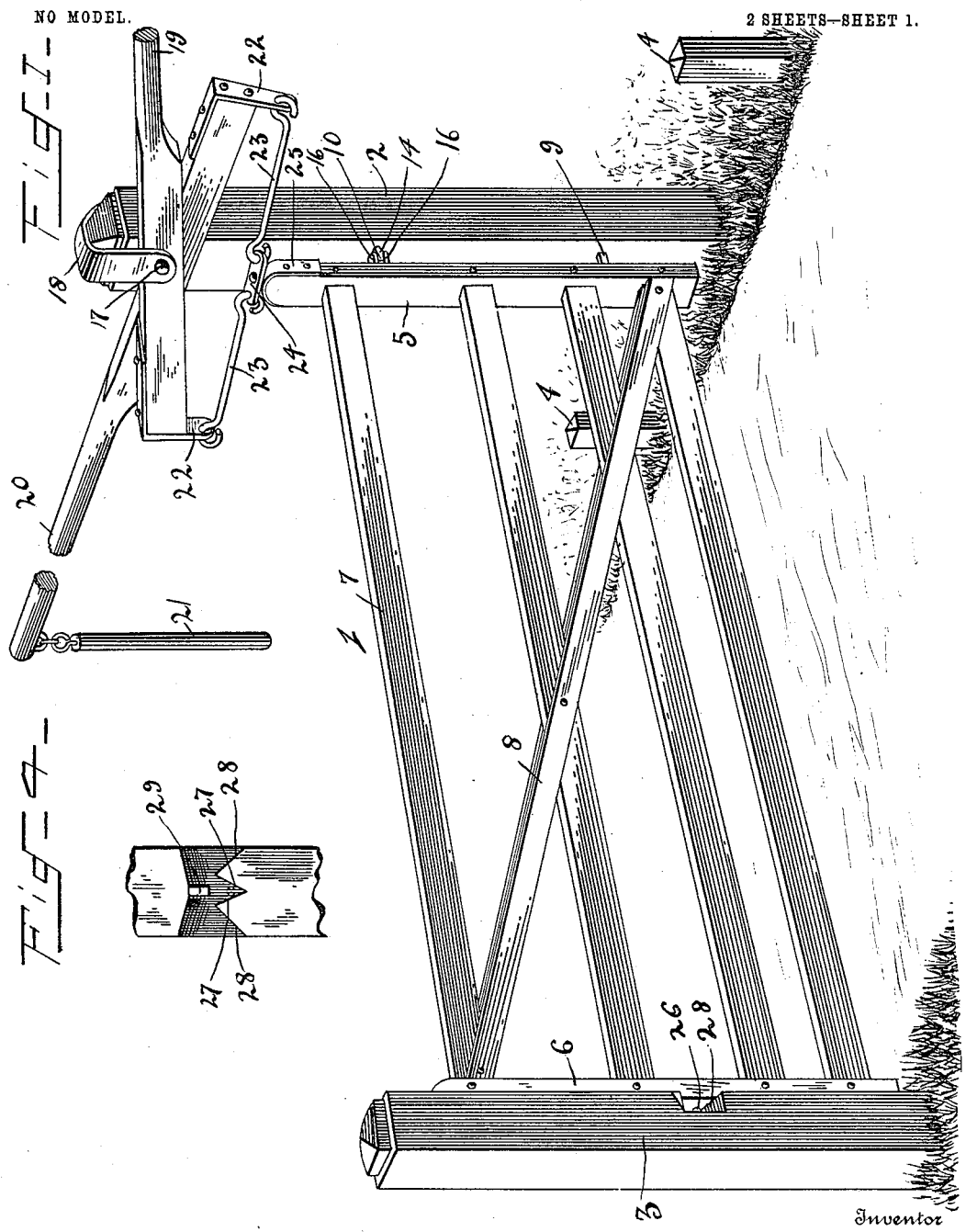

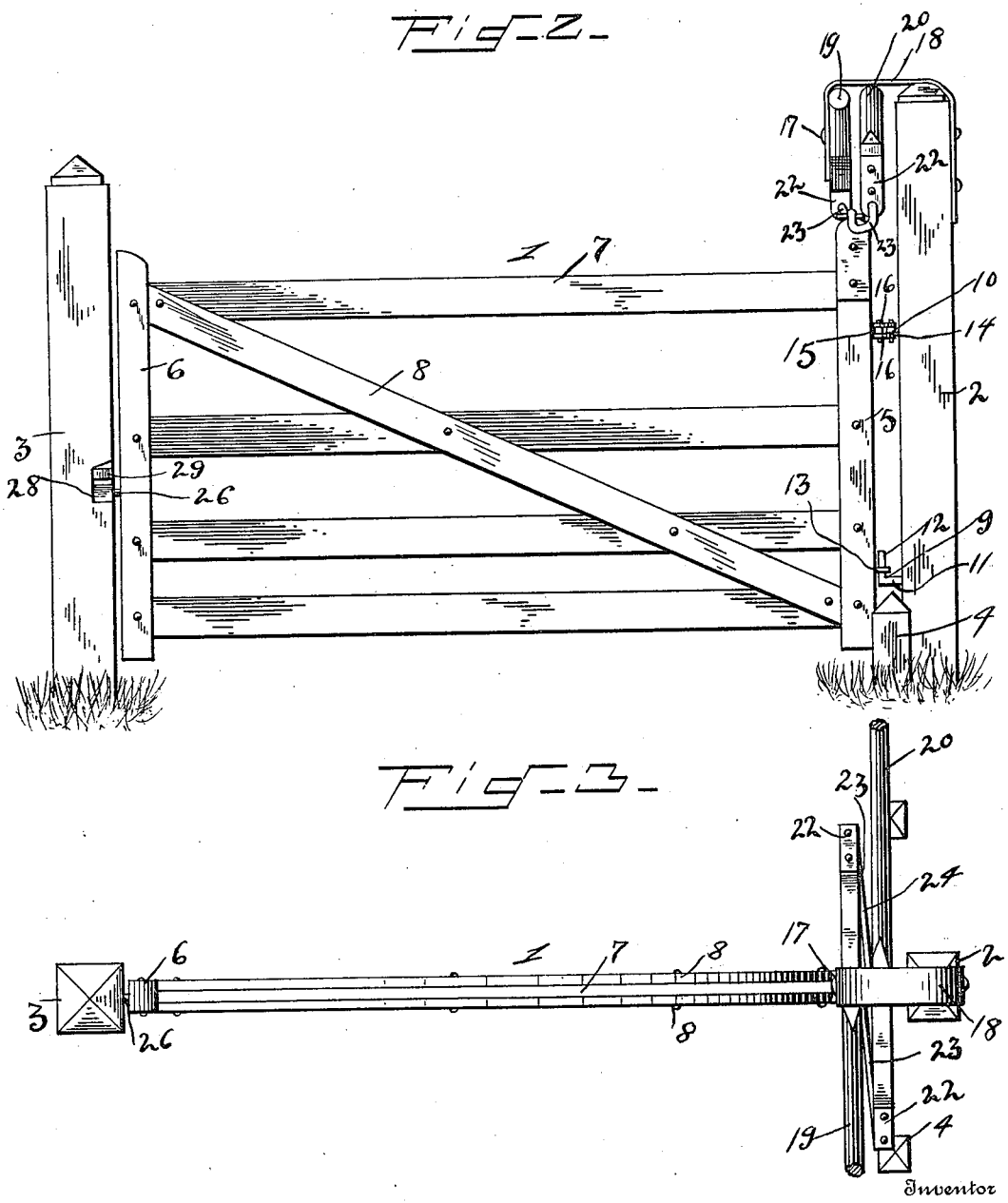

Patented April 5, 1904.

UNITED STATES PATENT OFFICE.

CHARLES T. HARRIS, OF ANNEX, VIRGINIA.

GATE.

SPECIFICATION forming part of Letters Patent No. 756,231, dated April 5, 1904.

Application filed April 27, 1903. Serial No. 154,530. (No model.)

*To all whom it may concern:*

Be it known that I, CHARLES T. HARRIS, a citizen of the United States, residing at Annex, in the county of Augusta and State of Virginia, have invented certain new and useful Improvements in Gates; and I do declare the following to be a full, clear, and exact description of the invention, such as will enable others skilled in the art to which it appertains to make and use the same.

My invention relates to certain new and useful gates of the swinging hand-opening type.

The object of the invention is to provide a device of this character which is simple in construction, durable in use, efficient in operation, and comparatively inexpensive of production.

With these and other objects in view the invention consists of certain novel features of construction, combination, and arrangement of parts, as will be more fully described, and particularly pointed out in the appended claim.

In the drawings, Figure 1 is a perspective view of my improved gate. Fig. 2 is a side elevation of the same. Fig. 3 is a top plan view. Fig. 4 is an elevation of the keeper upon the latch-post.

Referring to the drawings by numeral, 1 denotes the swinging gate; 2, the hinge-post; 3, the latch-post, and 4 the road-posts or stops. The gate may be of any preferred construction. That illustrated comprises the hinge-stile 5, the latch-stile 6, the connecting-rails 7, and the diagonal brace 8. Said gate is hung upon the hinge-post 2 by the hinges 9 and 10. The lower hinge 9 consists of a short bolt or screw 11, which is secured to the hinge-post and provided with a bent end or trunnion 12, and the eyebolt or screw 13, which is secured to the hinge-stile 5 and has its eye engaging the trunnion 12.

The upper hinge 10 is constructed to permit the gate to have a limited tilting movement, and comprises the two eyebolts or screws 14 and 15, the link-plates 16, and the pivot-pins or pintles. The eyebolts 14 and 15 are secured, respectively, to the hinge-post and the hinge-stile. The link-plates 16 are placed one above and one below the eyes of the bolts, which they connect by means of the pivot-pins or pintles, which pass through the said plates and the said eyes of the bolts.

Adjacent to the upper end of the hinge-post 2 is a horizontal pivot bolt or shaft 17, the outer end of which is supported by an angular brace or bracket 18, secured to the top of the said posts. Operating-levers 19 and 20 are pivoted on the bolt 17. The long arms of these levers are provided upon their ends with the loosely-connected depending handles 21. Upon the ends of the short arms of these levers are angle-brackets 22, which are connected by the links 23 to the opposite ends of a plate 24, which is pivoted at its center on a headed bolt upon the top of the hinge-stile of the gate. To strengthen and prevent wear upon the top of the hinge-stile, I prefer to cover the same with a piece of sheet metal 25.

The latch for the gate consists of a fixed horizontally-projecting stud 26 upon the latch-stile 6. The keeper for this latch upon the latch-post 3 consists of a recessed portion of the post and the stop-plate located in said recess. This recessed portion consists of the central V-shaped cavity 27, in which the latch-stud 26 is adapted to seat when the gate is closed, and the oppositely-inclined surfaces 28 upon each side of the central cavity for the purpose of guiding the latch into the cavity 27. 29 denotes a stop-plate in said recessed portion of the post directly over the center of the V-shaped cavity or recess and having its lower edge or bottom in a plane slightly above the plane of the upper ends of the inclines 28.

The operation of the gate is as follows: When the same is closed, as shown in Fig. 2, it hangs slightly tilted or inclined longitudinally toward the latch-post, but in a plumb or vertical position. When either of the operating-levers is rocked through the handles 21, the upward movement of the short arm of the lever operated will, through the link 23 and the pivoted plate 24, tilt the gate out of plumb toward the side it is to open on and at the same time will tilt the same vertically to raise the lower end of the gate, and hence raise the latch-stud 26 out of the cavity 27. The gate will be permitted to tilt transversely or out of plumb, owing to the construction of the hinge 10, and also to tilt vertically and longitudinally for the same reason. As the gate is thus tilted the latch-stud 26 is elevated out of the cavity 27 and passes to one side of the stop-plate 29, and by the continued elevation of the short arm of said operating-lever the gate will be swung open against one of the road-posts. To close the gate, the opposite operating-lever is operated, and the link 23 connecting its short end with the pivoted plate 24 upon the gate will pull the same closed. The latch-stud 26 as the gate closes strikes against the stop-plate 29, and the release of the handle of the operating-lever will permit the gate to drop to the position shown in Fig. 2.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

The combination with a hinge-post, of a gate hinged or pivoted to said post to swing horizontally and tilt vertically and laterally or transversely in the direction in which it swings, a cap upon the hinging-stile of said gate provided with a pivot, a plate 24 mounted loosely to rock vertically and to swing horizontally upon said pivot, an angular bracket-plate secured to the top of the hinge-post and having a depending portion, reversely-projecting levers extending between the post and said pivot portion and pivoted to said pivot portion, angular bracket-plates upon the inner ends of the levers, said bracket-plates having downwardly-bent portions, and links connecting the ends of the plate 24 with said downwardly-bent portions of the angular bracket-plates, substantially as described.

In testimony whereof I have hereunto set my hand in presence of two subscribing witnesses.

CHARLES T. HARRIS.

Witnesses:
J. BALDWIN RANSON,
HERBERT J. TAYLOR.